(12) United States Patent
Chong et al.

(10) Patent No.: US 11,632,721 B2
(45) Date of Patent: Apr. 18, 2023

(54) APPARATUS AND METHOD FOR CONTROLLING POWER CONSUMPTION IN WIRELESS COMMUNICATION

(71) Applicant: SAMSUNG ELECTRONICS CO., LTD., Suwon-si (KR)

(72) Inventors: Dahae Chong, Seongnam-si (KR); Joohyun Do, Seoul (KR); Shinwoo Kang, Seoul (KR); Beomkon Kim, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 234 days.

(21) Appl. No.: 17/039,661

(22) Filed: Sep. 30, 2020

(65) Prior Publication Data
US 2021/0266838 A1 Aug. 26, 2021

(30) Foreign Application Priority Data

Feb. 26, 2020 (KR) .................. 10-2020-0023840

(51) Int. Cl.
*H04W 52/02* (2009.01)
(52) U.S. Cl.
CPC .............. *H04W 52/0235* (2013.01)
(58) Field of Classification Search
CPC ................................................ H04W 52/0235
See application file for complete search history.

(56) References Cited

U.S. PATENT DOCUMENTS

| 7,010,674 | B2 | 3/2006 | Tremblay et al. |
| 7,606,329 | B2 | 10/2009 | Yamauchi |
| 7,844,804 | B2 | 11/2010 | Rychlik |
| 8,060,041 | B2 | 11/2011 | Ballantyne |
| 9,967,766 | B2 | 5/2018 | Kinthada Venkata et al. |
| 2012/0250731 | A1* | 10/2012 | Taghavi Nasrabadi ..................... H04W 88/06 375/147 |
| 2013/0275700 | A1 | 10/2013 | Wang et al. |
| 2015/0134935 | A1 | 5/2015 | Blasco |
| 2015/0156717 | A1 | 6/2015 | Narasimha et al. |
| 2016/0014697 | A1* | 1/2016 | Mujtaba ................ H04W 76/28 370/311 |
| 2016/0037578 | A1 | 2/2016 | Shah et al. |
| 2017/0177339 | A1 | 6/2017 | Shanbhogue et al. |
| 2019/0036647 | A1* | 1/2019 | Gowda ............ H04W 52/0219 |
| 2019/0104474 | A1 | 4/2019 | Raghunathan et al. |

FOREIGN PATENT DOCUMENTS

| JP | 2011-188268 | 9/2011 |
| JP | 2012-191533 | 10/2012 |

* cited by examiner

*Primary Examiner* — James P Duffy
(74) *Attorney, Agent, or Firm* — F. Chau & Associates, LLC

(57) ABSTRACT

The present disclosure relates to an apparatus for wireless communication. The wireless communication apparatus comprises a baseband processor and a controller. The baseband processor is configured to generate state information about a channel of the wireless communication by processing a baseband signal. The controller is configured to activate a low power operation in a first channel state, where a channel quality is reduced compared to than a second channel state, based on the state information.

19 Claims, 19 Drawing Sheets

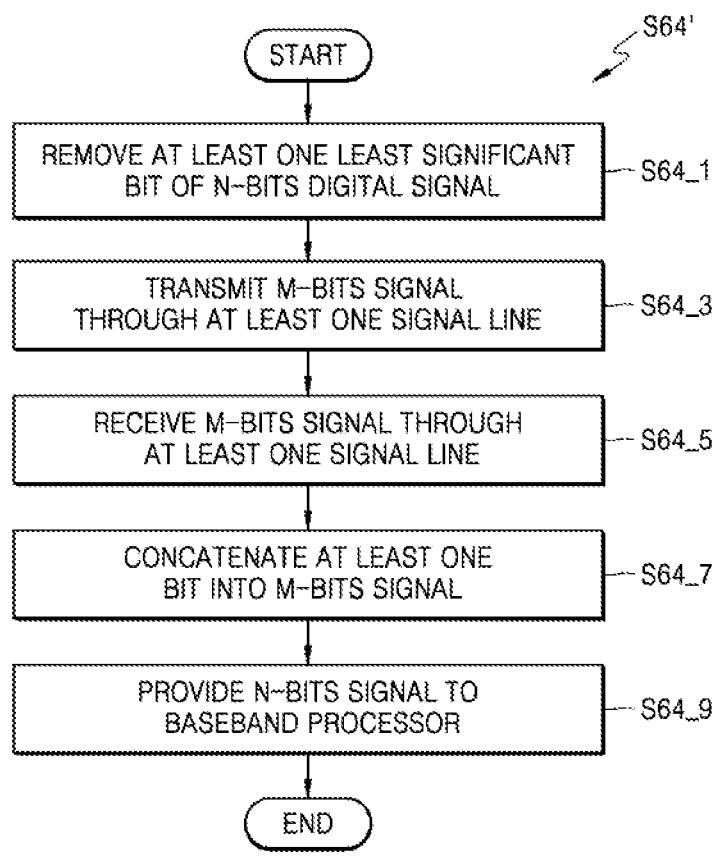

APPARATUS AND METHOD FOR CONTROLLING POWER CONSUMPTION IN WIRELESS COMMUNICATION

CROSS-REFERENCE TO RELATED APPLICATION

This application claims the benefit of Korean Patent Application No. 10-2020-0023840, filed on Feb. 26, 2020 in the Korean Intellectual Property Office, the disclosure of which is incorporated by reference herein in its entirety.

BACKGROUND

The inventive concept relates to wireless communication, and more particularly, to an apparatus and method for controlling power consumption in wireless communication.

Wireless communication systems provide the ability to transmit information between base stations and devices without the use of a wired connection. In some cases, wireless communication systems use high frequency bands and/or a high complexity protocols for high throughput of data.

Equipment for wireless communication include high performance device, supporting the high frequency bands and the high complexity protocols. As a result, the amount of power consumed by high performance equipment increases. In some cases, low complexity communication methods are used when a device has reduced signal quality (e.g., with access to systems using a more basic communication standard). However, the power consumption of the device may not be reduced in connection with the reduced the quality of a signal, causing high power consumption compared to the level of performance. Therefore, there is a need in the art for systems and methods to achieve more efficient power usage in high performance devices.

SUMMARY

The inventive concept provides an apparatus and method for reducing power consumption without sacrificing a throughput in wireless communication and for controlling the power consumption in the wireless communication.

According to an aspect of the inventive concept, an apparatus is provided for wireless communication including: a baseband processor configured to generate state information about a channel of the wireless communication by processing a baseband signal; and a controller configured to activate a low power operation in a first channel state that is worse than a second channel state, based on the state information.

According to another aspect of the inventive concept, a method is provided for wireless communication performed by a wireless communication apparatus, the method including: generating state information about a channel of the wireless communication by processing a baseband signal; and activating a low power operation in a first channel state that is worse than a second channel state, based on the state information.

According to another aspect of the inventive concept, an apparatus is provided for wireless communication including: an analog-to-digital converter configured to convert an analog signal generated from a signal received through the channel into a digital signal; a baseband processor configured to generate state information about a channel of the wireless communication by processing the digital signal; and a controller configured to adjust an effective number of bits of the digital signal based on the state information.

According to another aspect of the inventive concept, a method of communication includes communicating in a high performance mode; generating channel state information for a channel; determining that a channel state for the channel comprises a low quality channel state based on the channel state information; and communicating on the channel in a low power mode based on the determination.

BRIEF DESCRIPTION OF THE DRAWINGS

Embodiments of the inventive concept will be more clearly understood from the following detailed description taken in conjunction with the accompanying drawings in which:

FIG. 8 is a flowchart illustrating an example of a method for wireless communication, according to an example embodiment of the inventive concept;

DETAILED DESCRIPTION OF THE EMBODIMENTS

The present disclosure relates generally to a wireless communication apparatus. More particularly, embodiments of the present disclosure relate to a wireless communication apparatus capable of reducing power consumption based on a signal quality. Some embodiments adjust channel quality or a connection state of a device. For example, a device may adjust an effective number of bits based on the channel quality or connection state.

In some cases, communication techniques used by a high performance wireless device may be excessive if the connection or signal quality is reduced. As a result, power consumed by the device may also be excessive for the level of communication available based on the signal quality.

Accordingly, the present disclosure describes a wireless communication apparatus including a baseband processor configured to generate state information about a channel, and a controller configured to activate a low power mode of operation in a first channel state that is worse (i.e., that has reduced signal quality) compared to a second channel state based on the state information.

Figure 1:
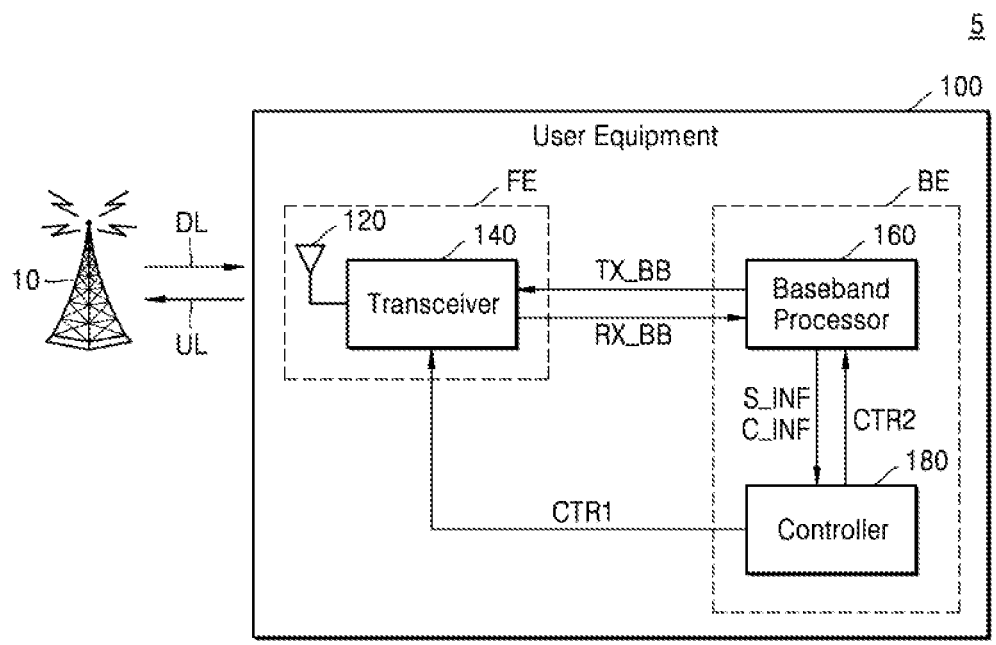
FIG. 1 is a diagram of a wireless communication system according to an example embodiment of the inventive concept.

FIG. 1 is a diagram of a wireless communication system 5 according to an example embodiment of the inventive concept. The wireless communication system 5 may be, as a non-limiting example, a wireless communication system using a cellular network such as a 5th generation new radio (5G NR) system, a long term evolution (LTE) system, an LTE-advanced system, a code division multiple access (CDMA) system, a global system for mobile communications (GSM) system, or any other wireless communication system such as a wireless local area network (WLAN) system, or any other wireless communication system. Hereinafter, the wireless communication system 5 is described as a wireless communication system using a cellular network, mainly with reference to the 5G NR system, but example embodiments of the inventive concept are not limited thereto.

A base station (BS) 10 may be generally referred to as a fixed station in communication with user equipment and/or other base station, and may exchange data and control information by communicating with the user equipment and/or the other base station. For example, the BS 10 may be referred to as a Node B, an evolved-Node B (eNB), a next generation node B (gNB), a sector, a site, a base transceiver system (BTS), an access point (AP), a relay node, a remote radio head (RRH), a radio unit (RU), a small cell, etc. Herein, the BS 10 or the cell may be interpreted in a generic sense to denote some area or function covered by a base station controller (BSC) in CDMA, the Node-B in WCDMA, an eNode B (eNB) in LTE, gNB in 5G, or a sector (site), etc., and may cover various coverage areas such as megacell, macrocell, microcell, picocell, femtocell, the relay node, RRH, RU, and a small cell communication range.

User equipment (UE) 100 may be stationary or mobile and may be referred to as any equipment capable of communicating with the BS 10 to transmit or receive data and/or control information. For example, the UE 100 may be referred to as a terminal, terminal equipment, a mobile station (MS), a mobile terminal (MT), a user terminal (UT), a subscriber station (SS), a wireless device, a handheld device, etc. Herein, the UE 100 or a component included in the UE 100 used for wireless communication may be referred to as a device for wireless communication. Hereinafter, example embodiments of the inventive concept are described mainly with reference to the UE 100, but the example embodiments of the inventive concept are not limited thereto.

A wireless communication network between the UE 100 and the BS 10 may support communication between multiple users by sharing available network resources. For example, in the wireless communication network, information may be transmitted in various multiple connection methods such as CDMA, frequency division multiple access (FDMA), time division multiple access (TDMA), orthogonal frequency division multiple access (OFDMA), single carrier frequency division multiple access (SC-FDMA), OFDM-FDMA, OFDM-TDMA, and OFDM-CDMA. As illustrated in FIG. 1, the UE 100 may communicate with the BS 10 through an uplink UL and a downlink DL. In some embodiments, the UE 100 may communicate with other user equipment through a sidelink, such as a device-to-device (D2D). As illustrated in FIG. 1, the UE 100 may include an antenna 120, a transceiver 140, a baseband processor 160, and a controller 180. In some embodiments, at least two of the antenna 120, the transceiver 140, the baseband processor 160, and the controller 180 may be included in one semiconductor package.

The antenna 120 may receive a signal from the BS 10 in a reception mode or output a signal provided by the transceiver 140 in a transmission mode. In some embodiments, the antenna 120 may include a plurality of antennas for at least one of spatial diversity, polarization diversity, spatial multiplexer, and beamforming.

The transceiver 140 may be connected to the antenna 120 and communicate with the baseband processor 160. In some embodiments, the transceiver 140 may be referred to as a radio frequency integrated circuit (RFIC). The transceiver 140 may provide an RX baseband signal RX_BB to the baseband processor 160 by processing a radio frequency (RF) signal received from the antenna 120 in the reception mode.

For example, a UE 100 may generate signals at one frequency (e.g., a relatively low frequency) and then transmit and receive signals at another frequency (e.g., a relatively high frequency). The frequency at which the signal is generated (or processed by the receiver) is sometimes known as the baseband frequency, while the transmission frequency (or reception frequency) is known as the radio frequency. The signals at one frequency (e.g., the transmission frequency) may be converted to another frequency (e.g., the baseband frequency) by combining the received frequency with another signal and filtering the result.

Additionally or alternatively, the transceiver 140 may provide the RF signal to the antenna 120 by processing a TX baseband signal TX_BB received from the baseband processor 160 in the transmission mode. In some embodiments, the transceiver 140 may include analog circuits such as analog filters, mixers, power amplifiers, and low noise amplifiers, and in some embodiments, as described below with reference to FIG. 3A, may include a digital-analog converter. As illustrated in FIG. 1, the transceiver 140 may receive a first control signal CTR1 from the controller 180, and perform a low power operation based on the first control signal CTR1.

For example, a UE 100 may include multiple operation modes. In a first operation mode (e.g., a high performance mode) the UE 100 may be capable of performing more complex signal processing, or communicating at a higher data rate. In a second operation mode (e.g., the low power operation), the UE may not perform the high complexity operations, and may not be capable of communicating data at the same rate as while in the high performance mode. However, in the low power operation mode, the UE may consume less power than while in the high performance mode. In some cases, if the channel quality is below a threshold, operation in the high performance mode does not achieve the desired increase in data rate (for example, if a communication protocol for operation in a low quality signal does not offer the same data rate as another communication protocol used when signal quality is higher). Thus, in some embodiments, a UE 100 may detect a channel state (e.g., a signal quality) that is less than a threshold and then switch to the low power operation mode accordingly.

The baseband processor 160 may communicate with the transceiver 140, and process the baseband signal. For example, the baseband processor 160 may include a demodulator, a decoder, and the like, and in the reception mode, may extract payload of the BS 10 by processing the baseband signal RX_BB received from the transceiver 140. Additionally or alternatively, the baseband processor 160 may include a modulator, an encoder, and the like, generate the TX baseband signal TX_BB based on the payload of the UE 100 in the transmission mode and provide the baseband signal TX_BB to the transceiver 140. The payload of the UE 100 may include a payload generated by the baseband processor 160 and/or a payload generated by other processors included in the UE 100, for example, a main processor generally controlling the UE 100. As illustrated in FIG. 1, the baseband processor 160 may generate state information S_INF of a channel of wireless communication and connection information C_INF about the connection of wireless communication, by processing the baseband signal, and may provide the state information S_INF and the connection information C_INF to the controller 180.

Components of the UE 100, such as the transceiver 140 and the baseband processor 160, may be designed to support a frequency band and a protocol defined by the wireless communication system 5. For example, the wireless communication system 5 may employ a protocol of a high-frequency band such as millimeter wave (mmWave) and high-complexity protocol such as 256QAM for high throughput. Additionally or alternatively, the transceiver 140 and the baseband processor 160 may be designed to provide high performance. Accordingly, the transceiver 140 may have high power consumption. However, when a channel between the BS 10 and the UE 100 is not adequate, the BS 10 may employ a lower frequency band in the downlink DL and/or the uplink UL, and/or a lower complexity scheme, and in this case, the performance provided by the transceiver 140 and/or the baseband processor 160 of the UE 100 may be excessive.

Even in a connected state (for example, during a telephone call), an idle state, a discontinuous reception (DRX) state, an initial access state, and the like, in which a high throughput is not required, the performance provided by the transceiver 140 and/or the baseband processor 160 of the UE 100 may be excessive. As described below, the controller 180 may dynamically limit the performance of the transceiver 140 and/or the baseband processor 160, based on the channel state and connection state. Accordingly, unnecessary power consumption of the transceiver 140 and/or the baseband processor 160 may be removed.

In some embodiments, the controller 180 may receive the state information S_INF from the baseband processor 160, provide the first control signal CTR1 to the transceiver 140 and provide the second control signal CTR2 to the baseband processor 160, based on the state information S_INF. In some embodiments, the controller 180 may generate the first and second control signals CTR1 and CTR2 based on the state information S_INF so that a low power operation is activated in a channel of a poor state, for example, a low quality channel. Accordingly, reduced power consumption may be achieved. Additionally or alternatively, the controller 180 may generate the first and second control signals CTR1 and CTR2 based on the state information S_INF so that a low power operation is deactivated in a channel of a good (or high performing) state, for example, a high quality channel. Accordingly, a high throughput may be obtained.

In some embodiments, the controller 180 may receive the connection information C_INF from the baseband processor 160, provide the first control signal CTR1 to the transceiver 140 and provide the second control signal CTR2 to the baseband processor 160, based on the connection information C_INF. In some embodiments, the controller 180 may generate the first and second control signals CTR1 and CTR2 based on the connection information C_INF so that the low power operation is activated in a connection state corresponding to a low processing complexity. Accordingly, the reduced power consumption may be achieved. Additionally or alternatively, the controller 180 may generate the first and second control signals CTR1 and CTR2 based on the connection information C_INF so that the low power operation is deactivated in a connection state corresponding to a high processing complexity. Accordingly, a high throughput may be obtained.

The state of a channel may be determined according to a channel estimation process. For example, in some cases UE 100 may perform channel estimation by generating channel state information (CSI), which refers to information describing the channel properties of the communication link. For example, the CSI may be determined by analyzing a reference signal transmitted by the transmitter. In some cases, CSI may describe how a signal propagates from the transmitter to the receiver and may represent the combined effects of, for example, scattering, fading, and power decay. After generating the CSI, the information may be used to adapt transmission and reception procedures to current channel conditions. This may result in improving the rate and reliability of communication, especially in multiantenna systems. In some cases, CSI is estimated at a receiver which provides feedback to the transmitter (although reverse-link estimation is also possible). In some cases, both the transmitter and receiver can have different CSI.

As described above, by adaptively adjusting the performance used for wireless communication in the UE 100 without sacrificing throughput of wireless communication, unnecessary power consumption may be removed. Additionally or alternatively, as the complexity of the frequency band and/or protocol of the wireless communication system 5 becomes higher, the adaptively adjustable power consumption may be increased. For example, the performance of the transceiver 140 and/or the baseband processor 160 may be higher. As a result, high performing wireless communication and reduced power consumption may be obtained simultaneously.

Referring to FIG. 1, the antenna 120 and the transceiver 140 may be collectively referred to as a front-end module FE, and the baseband processor 160 and the controller 180 may be collectively referred to as a back-end module BE. In some embodiments, each of the front-end and back-end modules FE and BE may be independent products, and a communication channel for transmitting baseband signals between the front-end and back-end modules FE and BE. For example, the TX baseband signal TX_BB and the RX baseband signal RX_BB, and a communication channel for transmitting the first control signal CTR1 may be formed. In some embodiments, the UE 100 may include a plurality of front-end modules. In some embodiments, each of the baseband processor 160 and the controller 180 may include a hardware block designed by logic synthesis, a software block including a series of instructions, and at least one core for executing a series of instructions. Additionally or alternatively, in some embodiments, the baseband processor 160 and the controller 180 may each correspond to software blocks executed by at least one common core.

Figure 2:
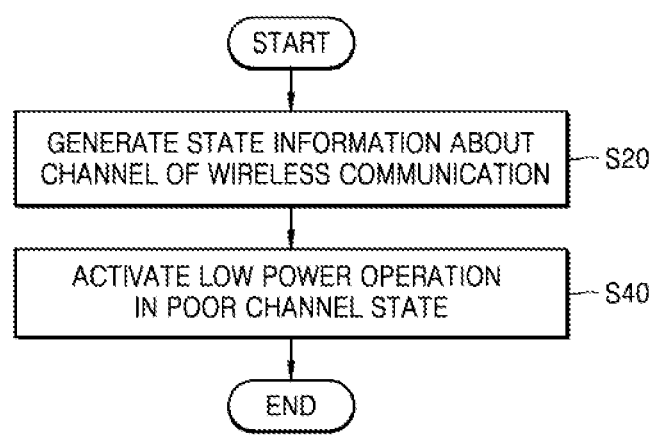
FIG. 2 is a flowchart illustrating an example of a method of controlling power consumption in wireless communication, according to an example embodiment of the inventive concept.

FIG. 2 is a flowchart illustrating an example of a method of controlling power consumption in wireless communication, according to an example embodiment of the inventive concept. In some embodiments, the method of FIG. 2 may be performed by the back-end module BE in FIG. 1. Herein, a method for controlling power consumption in wireless communication may be simply referred to as a method for wireless communication. As illustrated in FIG. 2, the method for wireless communication of FIG. 2 may include operations S20 and S40, and FIG. 2 is described below with reference to FIG. 1.

Referring to FIG. 2, an operation of generating the state information S_INF regarding a channel of wireless communication may be performed (S20). For example, the baseband processor 160 may generate the state information S_INF regarding a channel on which the downlink DL and the uplink UL are formed by processing the transmission and RX baseband signals TX_BB and RX_BB. The state information S_INF may include arbitrary information indicating a state of the channel. For example, the state information S_INF may include at least one of signal to noise ratio (SNR), signal to interference and noise ratio (SINR), reference signal received power (RSRP), a channel quality indicator (CQI) index and a modulation coding scheme (MCS) index. The BS 10 may determine the MCS index based on the channel state, and the MCS index may have a higher value as the channel state increases. Additionally or alternatively, as the MCS index increases, modulation order and a code rate may increase.

In some embodiments, the baseband processor 160 may generate the state information S_INF based on a reference signal provided by the BS 10. For example, the BS 10 may transmit a reference signal through the downlink DL for estimation of a channel between the BS 10 and the UE 100. The baseband processor 160 may estimate a channel by evaluating the reference signal based on the RX baseband signal RX_BB generated from the signal received through the antenna 120, and may generate the TX baseband signal TX_BB including information indicating the estimated channel, for example, channel state information (CSI) may be generated. The baseband processor 160 may not only feedback the estimated channel to the BS 10, but also generate the state information S_INF based on the estimated channel.

In some embodiments, the baseband processor 160 may generate the state information S_INF based on information provided by the BS 10. For example, the BS 10 may determine a scheme to be used for the downlink DL and/or the uplink UL based on the estimated channel provided by the UE 100, such as a modulation and coding scheme (MCS), and may transmit the MCS index corresponding to the determined MCS through the downlink DL. The baseband processor 160 may extract the MCS index by processing the RX baseband signal RX_BB, and generate the state information S_INF including the MCS index.

Referring to FIG. 2, an operation of activating a low power operation in a poor channel state may be performed (S40). For example, the controller 180 may activate the low power operation in a first channel state where a signal quality is reduced compared to a second channel state, based on the state information S_INF provided by the baseband processor 160. Herein, the low power operation may be referred to as an operation of wireless communication consuming relatively reduced power and is activated by the controller 180. As described above with reference to FIG. 1, because the performance provided by the transceiver 140 and/or the baseband processor 160 in the poor channel may be unnecessarily excessive, the controller 180 may reduce power consumption by limiting the performance of the transceiver 140 and/or the baseband processor 160. In some embodiments, as described below with reference to FIGS. 5A and 5B, one of a plurality of low power operations corresponding to different power consumptions may be selected based on the channel state indicated by the state information S_INF, and the selected low power operation may be activated. Examples of operation S40 is described below with reference to FIG. 4 and the like.

Accordingly, a method of communication may include communicating in a high performance mode; generating channel state information for a channel; determining that a channel state for the channel comprises a low quality channel state based on the channel state information; and communicating on the channel in the low power mode based on the determination. In some cases, the high performance mode comprises processing digital signals based on a first effective number of bits and the low power mode comprises processing the digital signals based on a second effective number of bits that is less than the first effective number of bits.

Figure 3A:
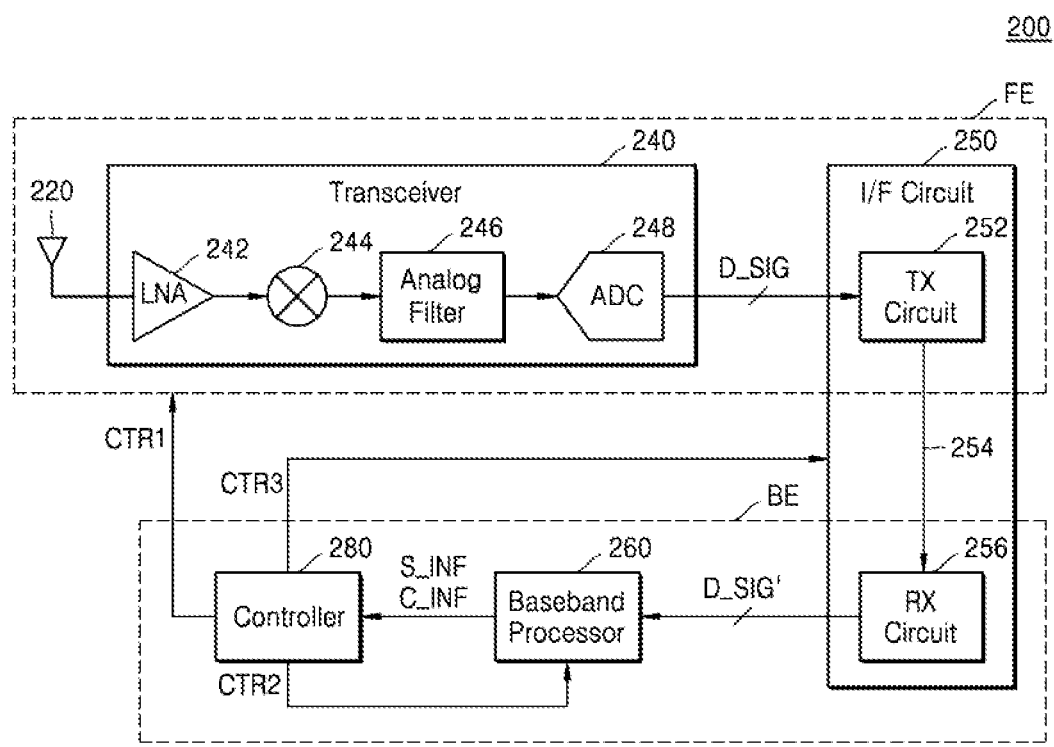
FIGS. 3A and 3B are block diagrams respectively illustrating examples of user equipment for wireless communication, according to example embodiments of the inventive concept.
Figure 3B:
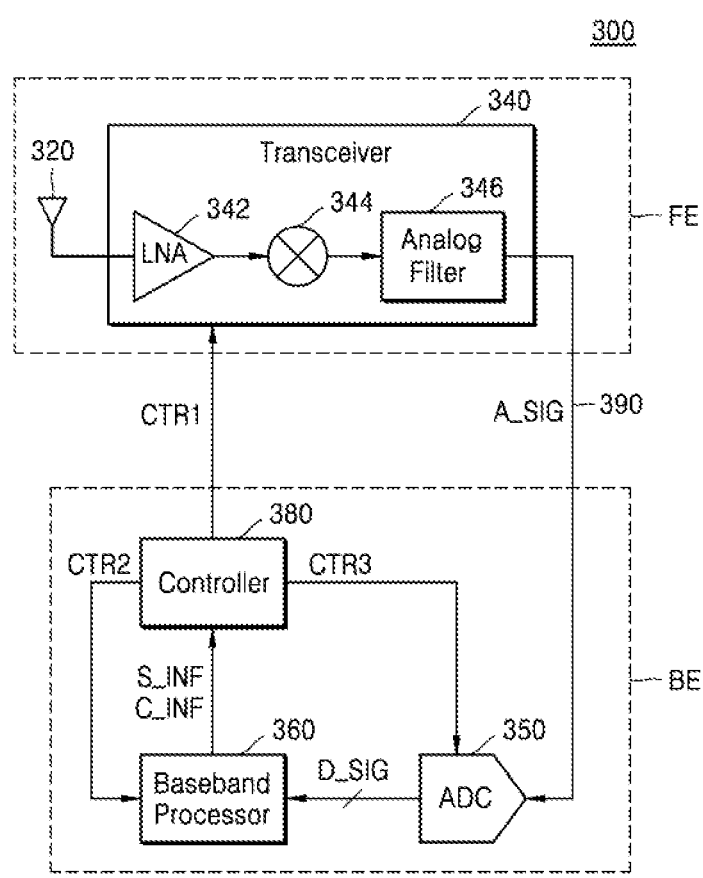

FIGS. 3A and 3B are block diagrams illustrating examples of UE 200 and 300 for wireless communication, according to example embodiments of the inventive concept, respectively. The block diagrams of FIGS. 3A and 3B may represent the UEs 200 and 300 in a reception mode, respectively. Below, descriptions with reference to FIGS. 3A and 3B duplicate those already given with reference to FIG. 1 are omitted.

Referring to FIG. 3A, the UE 200 may include, similar to the UE 100 in FIG. 1, an antenna 220, a transceiver 240, a baseband processor 260, and a controller 280. The baseband processor 260 may provide the state information S_INF and/or the connection information C_INF to the controller 280. The controller 280 may provide the first and second control signals CTR1 and CTR2 to the transceiver 240 and the baseband processor 260, respectively. The UE 200 may further include an interface (I/F) circuit 250 that provides a communication channel between the transceiver 240 and the baseband processor 260. The controller 280 may provide a third control signal CTR3 to the I/F circuit 250.

The transceiver 240 may, as illustrated in FIG. 3A, generate a digital signal D_SIG as the RX baseband signal RX_BB in FIG. 1, and provide the digital signal D_SIG to the I/F circuit 250. The baseband processor 260 may receive a digital signal D_SIG' from the I/F circuit 250 as the RX baseband signal RX_BB in FIG. 1. As illustrated in FIG. 3A, the I/F circuit 250 may include a transmission (TX) circuit 252, at least one signal line 254, and a reception (RX) circuit 256. The TX circuit 252 may transmit a signal generated from the digital signal D_SIG received from the transceiver 240 through at least one signal line 254. The RX circuit 256 may generate the digital signal D_SIG' from the signal received through the at least one signal line 254 and provide the digital signal D_SIG' to the baseband processor 260. As illustrated in FIG. 3A, the antenna 220, the transceiver 240, and the TX circuit 252 may be collectively referred to as the front-end module FE, while the RX circuit 256 and the baseband processor 260, and the controller 280 may be collectively referred to as the back-end module BE.

The transceiver 240 may include a low noise amplifier (LNA) 242, a mixer 244, an analog filter 246, and an analog-to-digital converter (ADC) 248. The LNA 242 may amplify a radio frequency (RF) signal received through the antenna 220, the mixer 244 may down-convert an output signal of the LNA 242, and the analog filter 246 may filter the output signal of the mixer 244. The ADC 248 may generate the digital signal D_SIG by converting the output signal of the analog filter 246. For example, an analog signal. In some embodiments, the transceiver 240 may further include components not illustrated in FIG. 3A, such as those for the transmission mode.

The transceiver 240 may receive the first control signal CTR1 from the controller 280, and selectively perform the low power operation based on the first control signal CTR1. In some embodiments, at least one of the LNA 242, the mixer 244, the analog filter 246, and the ADC 248 may have a reconfigurable structure according to the first control signal CTR1. For example, the LNA 242 may have variable gain, variable bandwidth and/or variable input/output impedance, the mixer 244 may have variable matching characteristics, the analog filter 246 may have a variable frequency response, and the ADC 248 may have a variable resolution. At least one of the LNA 242, the mixer 244, the analog filter 246, and the ADC 248 may, in response to the first control signal CTR1 activating the low power operation, be reconfigured to have low performance and low power consumption. Additionally or alternatively, the LNA 242, the mixer 244, the analog filter 246, and the ADC 248 may, in response to the first control signal CTR1 deactivating the low power operation, be reconfigured to have high performance and high power consumption.

The baseband processor 260 may receive the second control signal CTR2 from the controller 280 and may selectively perform the low power operation based on the second control signal CTR2. In some embodiments, the baseband processor 260 may deactivate some circuits processing the baseband signal in response to a second control signal CTR2 activating the low power operation and may process the baseband signal based on an algorithm corresponding to the low power consumption. Additionally or alternatively, the baseband processor 260 may reactivate the deactivated circuit in response to the second control signal CTR2 deactivating the low power operation and process the baseband signal based on an algorithm corresponding to the high performance.

The I/F circuit 250 may receive the third control signal CTR3 from the controller 280, and may selectively perform the low power operation based on the third control signal CTR3. In some embodiments, the I/F circuit 250 may, in response to the third control signal CTR3 activating the low power operation, transmit or receive a signal with at least one bits omitted from the digital signal D_SIG through the at least one signal line 254. Additionally or alternatively, the I/F circuit 250 may, in response to the third control signal CTR3 deactivating the low power operation, transmit or receive the digital signal D_SIG without loss through the at least one signal line 254.

Referring to FIG. 3B, the UE 300 may include an antenna 320, a transceiver 340, a baseband processor 360, and a controller 380, and further include an ADC 350. As illustrated in FIG. 3B, the antenna 320 and the transceiver 340 may be collectively referred to as the front-end module FE, and the ADC 350, the baseband processor 360. The controller 380 may be collectively referred to as the back-end module BE. The transceiver 340 may, similar to the transceiver 240 in FIG. 3A, include an LNA 342, a mixer 344, and an analog filter 346. Additionally or alternatively, the baseband processor 360 may provide the state information S_INF and/or the connection information C_INF to the controller 380, and the controller 380 may provide the first and second control signals CTR1 and CTR2 to the transceiver 340 and the baseband processor 360, respectively. Additionally or alternatively, the controller 380 may provide the third control signal CTR3 to the ADC 350, and as described above with reference to FIG. 3A, the ADC 350 may have a structure reconfigured by the third control signal CTR3.

When compared to the UE 200 of FIG. 3A, the transceiver 340 may generate an analog signal A_SIG as the RX baseband signal RX_BB in FIG. 1, and the baseband processor 260 may receive the digital signal D_SIG as the baseband signal RX_BB in FIG. 1. Additionally or alternatively, unlike the UE 200 of FIG. 3A in which the digital signal D_SIG is transmitted from the front-end module FE to the back-end module BE, the analog signal A_SIG in the UE 300 of FIG. 3B may be transmitted from the front-end module FE to the back-end module BE. The transceiver 340 may transmit the analog signal A_SIG through at least one signal line 390, and the ADC 350 may generate the digital signal D_SIG by converting the analog signal A_SIG received through the at least one signal line 390.

Hereinafter, example embodiments of the inventive concept are described mainly with reference to the UE 200 of FIG. 3A. However, example embodiments of the inventive concept are applicable to the UE 300 of FIG. 3B and a UE with a different structure from the UE 200 and 300 of FIGS. 3A and 3B.

Figure 4:
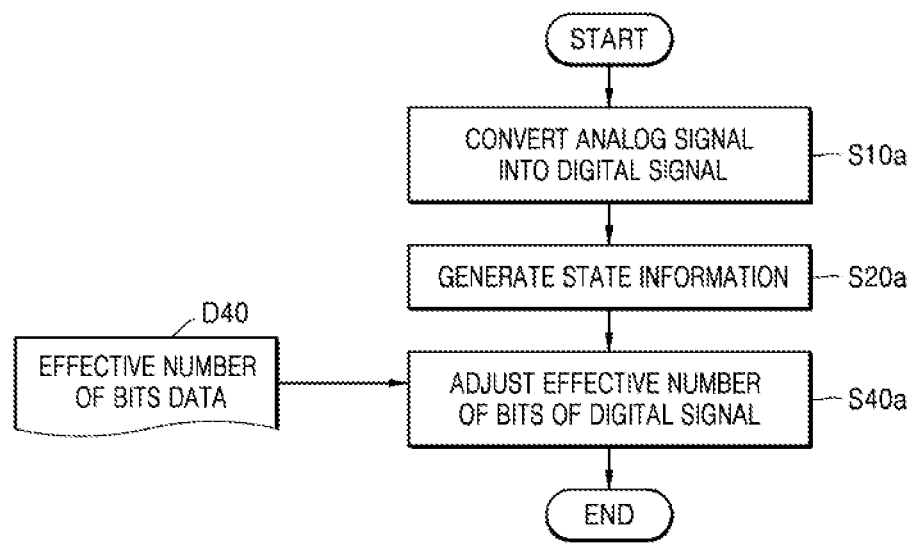
FIG. 4 is a flowchart illustrating an example of a method for wireless communication, according to an example embodiment of the inventive concept.

FIG. 4 is a flowchart illustrating an example of a method for wireless communication, according to an example embodiment of the inventive concept. In some embodiments, the method for wireless communication of FIG. 4 may be performed by the UE 200 of FIG. 3A. As illustrated in FIG. 4, the method for wireless communication may include a plurality of operations S10a, S20a, and S40a. Hereinafter, FIG. 4 is described with reference to FIG. 3A, and duplicate descriptions previously given with reference to FIG. 2 are omitted.

An operation of converting an analog signal to a digital signal may be performed (S10a). For example, the ADC 248 included in the transceiver 240 may generate the digital signal D_SIG by converting an analog signal provided by the analog filter 246. The ADC 248 may have a resolution of N (N is an integer greater than 1), and the digital signal D_SIG may include an N-bit signal. As described above with reference to FIG. 3A, the digital signal D_SIG may correspond to the RX baseband signal RX_BB of FIG. 1.

An operation of generating the state information S_INF may be performed (S20a). For example, the baseband processor 260 may receive the digital signal D_SIG' corresponding to the received baseband signal RX_BB in FIG. 1, and generate the state information S_INF by processing the digital signal D_SIG'. The baseband processor 260 may provide the state information S_INF to the controller 280. An example of operation S20a is described later with reference to FIG. 10.

An operation of adjusting the number of effective bits of a digital signal may be performed (S40a). For example, the controller 280 may adjust an effective number of bits (ENOB) of a digital signal, based on the state information S_INF provided by the baseband processor 260, by referring to the ENOB data D40. The ENOB may be referred to an effective resolution of a digital signal and may be determined to provide a signal to quantization noise ratio (SQNR) equal to or greater than the SNR of a channel. For example, one bit of the digital signal may correspond to about 6.02 dB of SQNR. Accordingly, the number of bits N of the digital signal may be used to be about Z/6.02 or larger to provide Z dB of SQNR (where N≥ceil(Z/6.02)). As the number of bits N of the digital signal increases, a higher SQNR may be obtained, but the increase in the number of bits N of the digital signal may cause an increase in cost, for example, an increase in area, power consumption, etc.

The controller 280 may generate the first through third control signals CTR1 through CTR3 so that the ENOB of the digital signal is reduced in the poor channel, while generating the first through third control signals CTR1 through CTR3 so that the ENOB of the digital signal is increased in the good (or high performing) channel. In some embodiments, the controller 280 may adjust the ENOB of the digital signal D_SIG generated by the transceiver 240 by using the first control signal CTR1. Additionally or alternatively, in some embodiments, the controller 280 may adjust the ENOB of the digital signal D_SIG' provided by the I/F circuit 250 by using the third control signal CTR3. Additionally or alternatively, in some embodiments, the controller 280 may adjust the ENOB of the digital signal processed in the baseband processor 260 by using the second control signal CTR2. Examples of operations in which the ENOB of the digital signal is adjusted in response to the first through third control signals CTR1 through CTR3 provided by the controller 280 are described with reference to FIG. 6 and the like.

The ENOB data D40 may include the ENOB corresponding to the state information S_INF, and may be referred to by the controller 280. In some embodiments, the ENOB data D40 may be stored in a storage (for example, a non-volatile memory). The ENOB data D40 may be accessible by the controller 280 and included in the back-end module BE. Examples of the ENOB data D40 are described below with reference to FIGS. 5A and 5B.

Figure 5A:
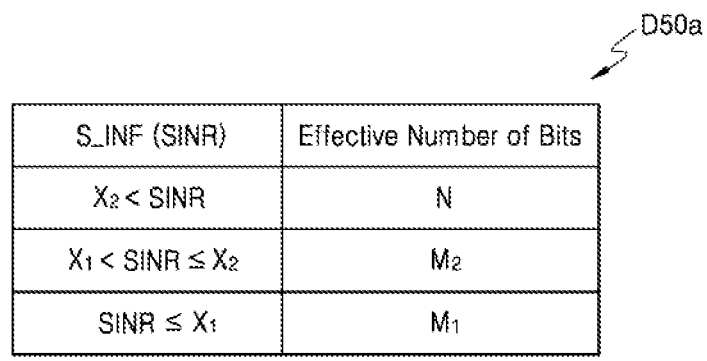
FIGS. 5A and 5B are diagrams illustrating examples of effective-number-of-bits data, according to example embodiments of the inventive concept.
Figure 5B:
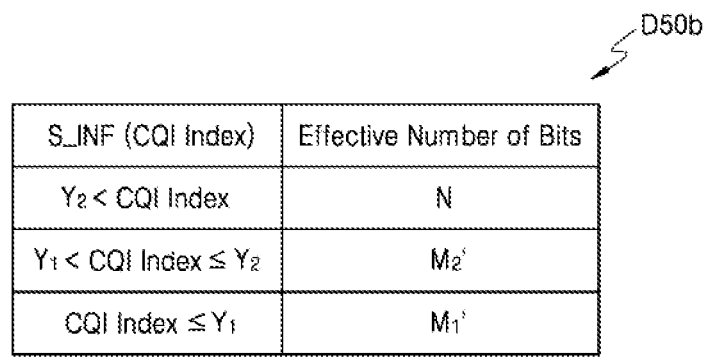

FIGS. 5A and 5B are diagrams illustrating examples of ENOB data D50*a* and D50*b*, according to example embodiments of the inventive concept. As described above with reference to FIG. 4, the ENOB data may be used to adjust the ENOB of the digital signal based on the state information S_INF. Hereinafter, FIGS. 5A and 5B are described with reference to FIG. 3A, and the digital signal is assumed to be an N-bit signal.

Referring to FIG. 5A, the effective bit number ENOB data D50*a* may include a look-up table with the ENOB corresponding to the SINR. For example, as illustrated in FIG. 5A, the ENOB data D50*a* may include three SINR ranges defined by a first threshold value X1 and a second threshold value X2 greater than the first threshold value X1, and three ENOBs $M_1$, $M_2$, and N respectively corresponding thereto. The baseband processor 260 may measure the SINR of the channel based on the reference signal provided by the BS (for example, 10 in FIG. 1), and the state information S_INF may include the SINR. A good channel may have a high SINR and communication may be performed based on a high complexity. For example, a high modulation order scheme for high throughput in the good channel may have a high SINR. Additionally or alternatively, a poor channel may have a low SINR and communication may be performed based on a low complexity scheme for a reduced throughput in the poor channel. Accordingly, as illustrated in FIG. 5A, as the SINR increases, the ENOB may also increase ($M_1 < M_2 < N$).

Referring to FIG. 5B, the ENOB data D50*b* may include a look-up table with the ENOB corresponding to the CQI index. The CQI index may be included in the CSI provided to the BS by the UE 200. Additionally or alternatively, the CQI index may be generated based on a CQI table. The CQI index may have a higher value for a better channel. As illustrated in FIG. 5B, the ENOB data D50*b* may include three CQI index ranges defined by a first threshold value $Y_1$ and a second threshold value $Y_2$ greater than the first threshold value $Y_1$, and three ENOBs $M_1'$, $M_2'$, and N' respectively corresponding thereto. The baseband processor 260 may generate the CQI index based on the channel estimation and the CQI table, and the state information S_INF may include the CQI index. A good channel may have a high CQI index, and the high CQI index may correspond to a high modulation order. Additionally or alternatively, a poor channel may have a low CQI index, and the low CQI index may correspond to a low modulation order. Accordingly, as illustrated in FIG. 5B, as the CQI index increases, the ENOB may also increase ($M_1' < M_2' < N$).

In some embodiments, the ENOB data D40, unlike as illustrated in FIGS. 5A and 5B, may include a function with the state information S_INF as an argument and the ENOB as an output. Accordingly, the controller 280 may obtain the ENOB of the digital signal by providing the function with the state information S_INF.

Figure 6:
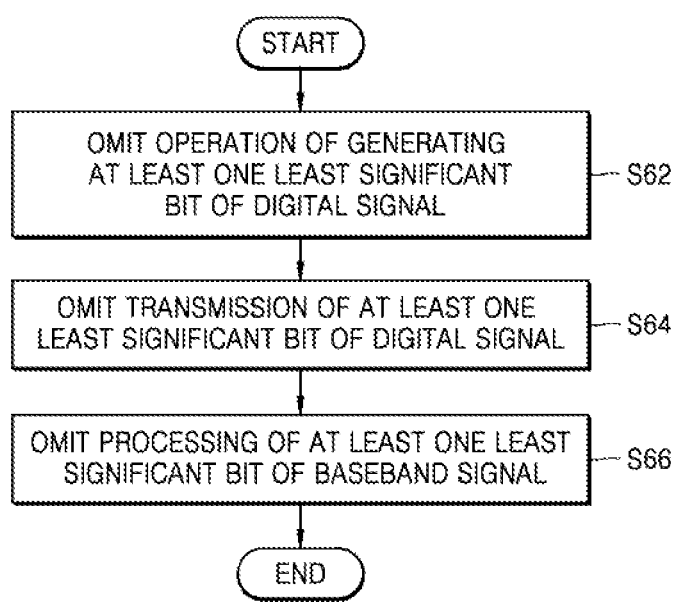
FIG. 6 is a flowchart illustrating an example of a method for wireless communication, according to an example embodiment of the inventive concept.

FIG. 6 is a flowchart illustrating an example of a method for wireless communication, according to an example embodiment of the inventive concept. The flowchart of FIG. 6 illustrates a method of implementing a reduced ENOB of a digital signal for the low power operation in operation S40*a* in FIG. 4. As illustrated in FIG. 6, the method for wireless communication of FIG. 6 may include a plurality of operations S62, S64, and S66, and in some embodiments, a portion of the plurality of operations S62, S64, and S66 may be performed to reduce the ENOB. Hereinafter, FIG. 6 is described with reference to FIG. 3A.

An operation of generating at least one least significant bit (LSB) of the digital signal may be omitted (S62). For example, the ADC 248 may omit an operation of generating the at least one LSB of the digital signal D_SIG in response to the first control signal CTR1 activating the low power operation. Accordingly, upper M-bits of N-bits of the digital signal D_SIG may have effective values (1<M<N). Accordingly, the power consumed by the ADC 248 may be reduced due to the omitted operation. Omission of the operation of generating the at least one LSB of the digital signal D_SIG may be performed in various ways depending on the structure of the ADC 248, and an example thereof is described later with reference to FIGS. 7A and 7B.

Transmission of the at least one LSB of the digital signal D_SIG may be omitted (S64). For example, the I/F circuit 250 may transmit or receive the upper M-bits of the digital signal D_SIG by omitting transmission and reception of the at least one LSB of the digital signal D_SIG. Accordingly, the I/F circuit 250 may consume power reduced from that for transmitting and receiving the digital signal D_SIG of N-bits. An example of operation S64 is described later with reference to FIG. 8.

Processing of the at least one LSB of the digital signal D_SIG may be omitted (S66). For example, the baseband processor 260 may omit the processing of (N−M) of the LSBs among the N-bits of the digital signal D_SIG as the baseband signal in response to the second control signal CTR2 activating the low power operation. In this case, the baseband signal may include a signal received by the baseband processor 260 and an internal digital signal generated by the baseband processor 260. The power consumed by the baseband processor 260 may be reduced due to omitted processing. An example of operation S66 is described later with reference to FIGS. 9A and 9B.

Figure 7A:
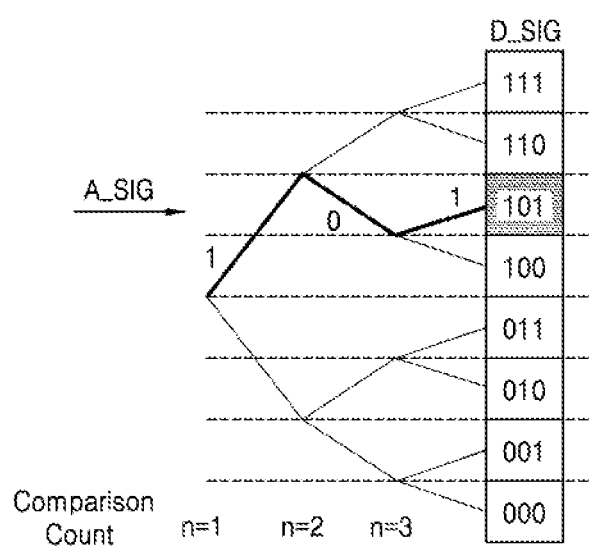
FIGS. 7A and 7B are diagrams illustrating examples of an operation of reducing an effective number of bits, according to example embodiments of the inventive concept.
Figure 7B:
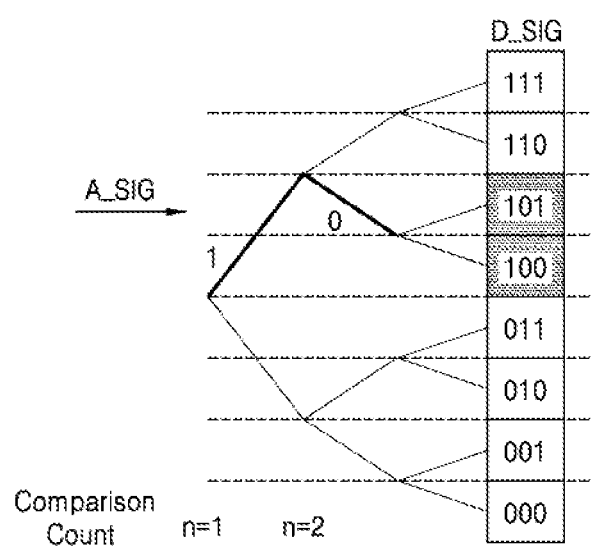

FIGS. 7A and 7B are diagrams illustrating examples of an operation of reducing the ENOB, according to example embodiments of the inventive concept. FIGS. 7A and 7B are diagrams for describing an operation in which the ENOBs are reduced in an ADC. As described above with reference to FIG. 6, the ADC may omit an operation of generating the at least one LSB of the digital signal D_SIG in response to a control signal activating the low power operation. Hereinafter, FIGS. 7A and 7B are described with reference to FIG. 3B.

In some embodiments, the ADC 350 that generates the digital signal D_SIG by converting the analog signal A_SIG may include a successive approximation (SAR) ADC. The SAR ADC may convert an analog signal to a digital signal based on a binary search, and sequentially determine bits of the digital signal from the most significant bit (MSB) to the LSB. In FIGS. 7A and 7B, the ADC 350 is assumed to generate the digital signal D_SIG of 3-bits from the analog signal A_SIG (N=3).

Referring to FIG. 3A, the ADC 350 may generate the digital signal D_SIG with a value of '101' corresponding to the analog signal A_SIG by sequentially performing comparison operations for three times in response to the third control signal CTR3 deactivating the low power consumption. Additionally or alternatively, referring to FIG. 3B, the ADC 350 may omit the operation of generating the LSB, in response to the third control signal CTR3 activating the low power operation. Accordingly, as illustrated in FIG. 3B, the ADC 350 may perform two comparison operations, and generate the digital signal D_SIG with a value of '100' or '101'. Accordingly, due to the omitted comparison operations, the ADC 350 may consume reduced power. Additionally or alternatively, in some embodiments, the ADC 350 may generate the digital signal D_SIG in an early stage in response to the third control signal CTR3 activating the low power operation, and the power consumption may be reduced due to a reduced operation time of the ADC 350.

FIG. 8 is a flowchart illustrating an example of a method for wireless communication, according to an example embodiment of the inventive concept. The flowchart of FIG. 8 is a flowchart illustrating an example of operation S64 of FIG. 6. As described above with reference to FIG. 6, in operation S64' in FIG. 8, the I/F circuit 250 in FIG. 3A may omit transmission of the at least one LSB of the digital signal D_SIG, in response to the third control signal CTR3 activating the low power operation. As illustrated in FIG. 8, operation S64' may include a plurality of operations S64_1, S64_3, S64_5, S64_7, and S64_9, and FIG. 8 is described below with reference to FIGS. 3A and 6.

Removing the at least one LSB of the digital signal D_SIG of N bits may be performed (S64_1). For example, the TX circuit 252 of the I/F circuit 250 may remove (or discard) (M−N) of the LSBs of the N bits of the digital signal D_SIG provided by the transceiver 240. Accordingly, a M-bits signal may be generated. In some embodiments, the TX circuit 252 may remove the (M−N) of the LSBs based on rounding.

An operation of transmitting a M-bits signal through the at least one signal line 254 may be performed (S64_3). For example, the TX circuit 252 may convert the M-bits signal for high-speed transmission and may transmit the converted signal through the at least one signal line 254. Accordingly, power consumption may be reduced by transmitting M bits instead of N bits of the digital signal D_SIG. In some embodiments, the TX circuit 252 may transmit a packet including the M-bits signal and a header through the at least one signal line 254.

An operation of receiving the M-bits signal through the at least one signal line 254 may be performed (S64_5). For example, the RX circuit 256 may receive the converted signal for high-speed transmission through the at least one signal line 254, and obtain the M-bits signal by converting the received signal. In some embodiments, the RX circuit 256 may receive the packet, and obtain the M-bits signal by removing the header from the packet.

An operation of concatenating at least one bit into the M-bits signal may be performed (S64_7). For example, the RX circuit 256 may generate the digital signal D_SIG' of N bits by concatenating (N−M) bits into the M-bits signal. In some embodiments, the (N−M) bits may have values, such as zeros or ones. As a result, the digital signal D_SIG' generated by the RX circuit 256 may correspond to a version in which some information has been lost in the digital signal D_SIG generated by the transceiver 240.

An operation of providing a N-bits signal to the baseband processor 260 may be performed (S64_9). For example, the RX circuit 256 may provide the N-bits digital signal D_SIG' generated in operation S64_7 to the baseband processor 260, and the baseband processor 260 may process the digital signal D_SIG'.

Figure 9A:
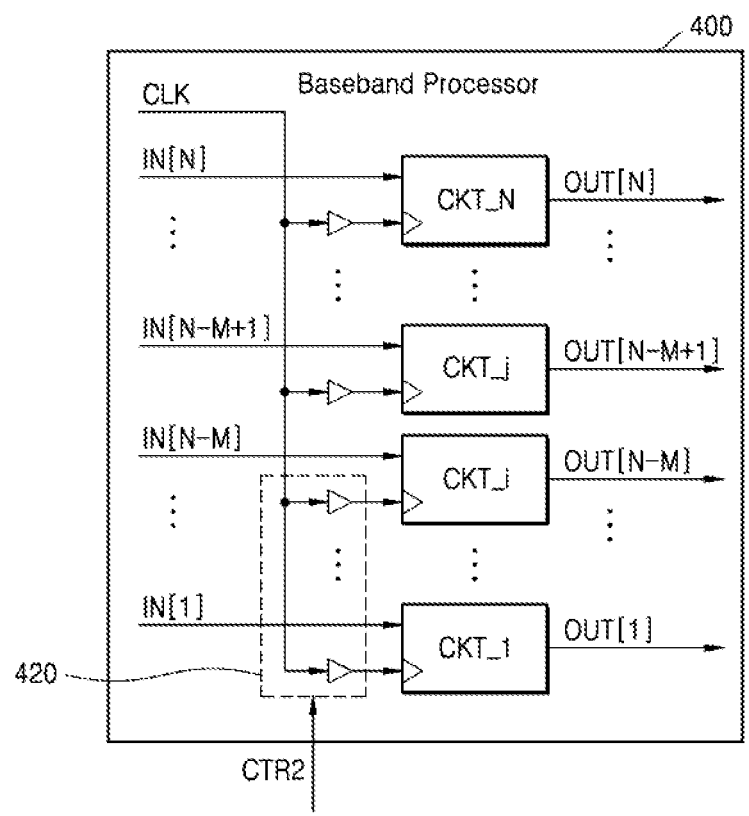
FIGS. 9A and 9B are block diagrams illustrating an operation of reducing the effective number of bits, according to example embodiments of the inventive concept.
Figure 9B:
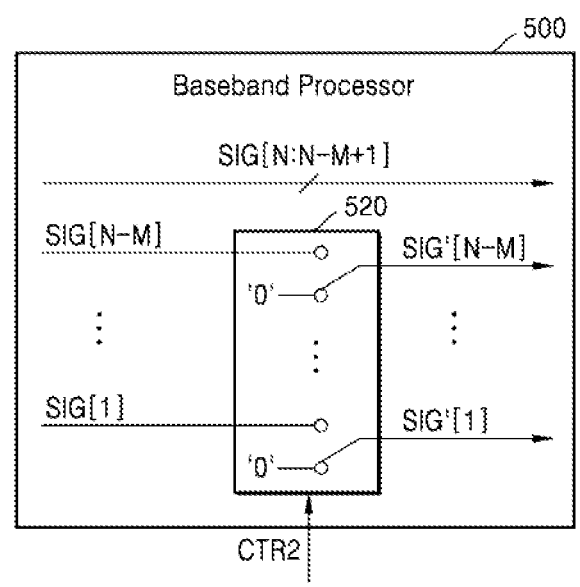

FIGS. 9A and 9B are block diagrams illustrating an operation of reducing the ENOBs, according to example embodiments of the inventive concept. The block diagrams of FIGS. 9A and 9B, as examples of operation S66 in FIG. 6, illustrate examples, of the baseband processor, for an operation of omitting a process of the at least one LSB of the baseband signal in response to the second control signal CTR2 activating the low power operation. Hereinafter, FIGS. 9A and 9B are described with reference to FIG. 3B, and duplicate descriptions with reference to FIGS. 9A and 9B are omitted.

Referring to FIG. 9A, a baseband processor 400 may include first through $N^{th}$ processing circuits CKT_1 through CKT_N for processing N-bits input signal IN[N:1]. The N-bits input signal IN[N:1] as a baseband signal may be the digital signals D_SIG' provided to the baseband processor 400 or may be internal signals generated by the baseband processor 400 in the processing of the digital signals D_SIG'. As illustrated in FIG. 9A, each of the first through $N^{th}$ processing circuits CKT_1 through CKT_N may process each bit of N-bits input signal IN[N:1], and generate a N-bits output signal OUT[N:1]. Additionally or alternatively, the first through $N^{th}$ processing circuits CKT_1 through CKT_N may operate in synchronization with a clock signal CLK.

The baseband processor 400 may further include a clock gating circuit 420, which performs gating clock signals provided to the processing circuits that process (N−M) of LSBs of the N-bits input signal IN[N:1], in response to the second control signal CTR2 activating the low power consumption. The $j^{th}$ through $N^{th}$ processing circuits CKTj through CKT_N may generate M-bits output signal OUT[N:M−M+1] by processing each bit of M-bits input signal IN[N:N−M+1], regardless of the second control signal CTR2 (j=N−M+1). Additionally or alternatively, when the second control signal CTR2 activates the low power operation, (N−M) of processing circuits, i.e., the first through $i^{th}$ processing circuits CKT1 through CKTi may generate (N−M)-bits output signal OUT[N−M:1] by processing each bit of (M−N)-bits input signal IN[N−M:1] (i=N−M). Accordingly, dynamic power consumed by the first through $i^{th}$ processing circuits CKT1 through CKTi may be removed. As a result, the (N−M)-bits output signal OUT[N−M:1] may have values (for example, values before the clock gating).

Referring to FIG. 9B, the baseband processor 500 may include a padding circuit 520 for fixing (N−M) of the LSBs of N-bits signal SIG[N:1], i.e. (N−M)-bits signal SIG[N-M:1] at values, in response to the second control signal CTR2 activating the low power operation. For example, as illustrated in FIG. 9B, the padding circuit 520 may perform the padding of zeros into (N−M)-bits signal SIG'[N-M:1], in response to the second control signal CTR2 activating the lower power operation. Accordingly, subsequent operations on the (N−M) bits in the baseband processor 500 may be reduced or omitted. As a result, the power consumption may be reduced.

Figure 10:
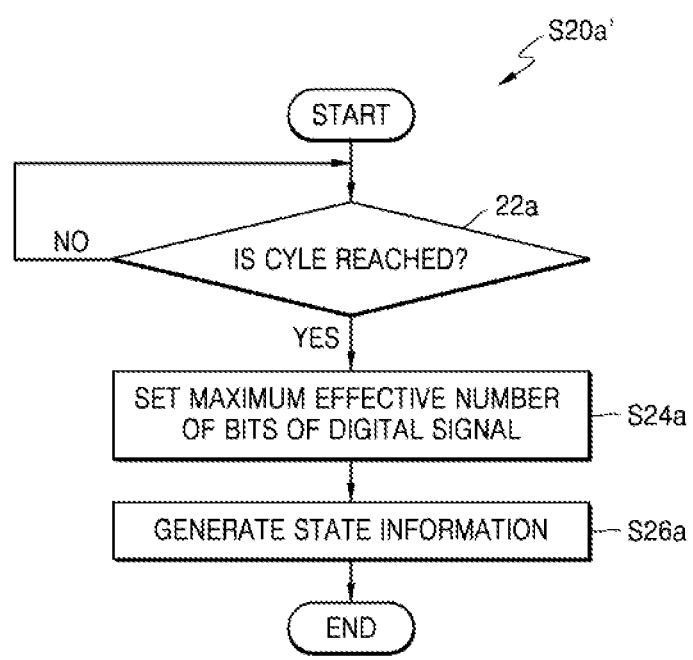
FIG. 10 is a flowchart illustrating an example of a method for wireless communication, according to an example embodiment of the inventive concept.

FIG. 10 is a flowchart illustrating an example of a method for wireless communication, according to an example embodiment of the inventive concept. The flowchart of FIG. 10 is a flowchart illustrating an example of operation S20a in FIG. 4. As described above with reference to FIG. 4, an operation of generating the state information S_INF may be performed (S20a'). As illustrated in FIG. 10, operation S20a' may include a plurality of operations S22a, S24a, and S26a. In some embodiments, operation 20a' may be performed in the UE 100 in FIG. 1, and below, FIG. 10 is explained with reference to FIG. 1.

An operation of determining whether a cycle is reached may be performed (S22a). A channel between the BS 10 and the UE 100 may be changed due to various causes. For example, when the UE 100 moves from a boundary of a cell to the center of the cell, the channel may gradually have a better state, but when the UE 100 moves from the center to the boundary of the cell, the channel may gradually have a poorer state. The state information S_INF generated based on a digital signal with a reduced ENOB for the low power operation may not accurately represent a changed state of a channel due to the reduced ENOB. For example, when the channel state is rapidly changed to a good state, even though a high throughput is possible, the channel state may be estimated as poor due to the reduced ENOB. Accordingly, in some embodiments, the state information S_INF may be generated for cycles based on a high ENOB (for example, the maximum ENOB) of a digital signal. As illustrated in FIG. 10, when the cycle is reached, operation S24a may be performed subsequently.

An operation of setting the maximum ENOB of the digital signal may be performed (S24a). For example, the baseband processor 160 may transmit the arrival of a cycle to the controller 180, and the controller 180 may generate the first and second control signals CTR1 and CTR2 so that the ENOB of the digital signal becomes the maximum. Additionally or alternatively, the controller 180 may determine the arrival of the cycle, and generate the first and second control signals CTR1 and CTR2 so that the ENOB of the digital signal becomes the maximum.

An operation of generating the state information S_INF may be performed (S26a). For example, the baseband processor 160 may estimate a channel by processing the RX baseband signal RX_BB, and generate the state information S_INF based on the estimated channel. Accordingly, the channel state may be estimated in a state in which the ENOB of the digital signal is not limited. In some embodiments, the baseband processor 160 may generate state information S_INF in response to the second control signal CTR2 generated by the controller 180 such that the ENOB of the digital signal becomes the maximum.

Figure 11:
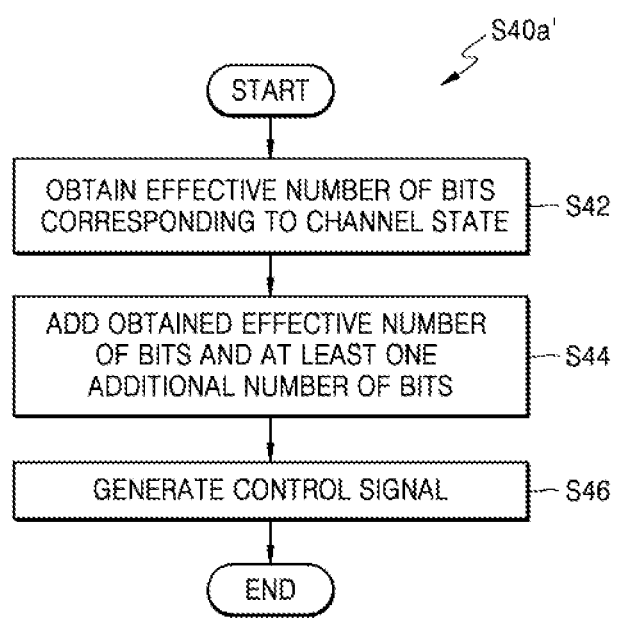
FIG. 11 is a flowchart illustrating an example of a method for wireless communication, according to an example embodiment of the inventive concept.

FIG. 11 is a flowchart illustrating an example of a method for wireless communication, according to an example embodiment of the inventive concept. The flowchart of FIG. 11 is a flowchart illustrating an example of operation S40a in FIG. 4. As described above with reference to FIG. 4, the operation of adjusting the ENOB of the digital signal may be performed in operation S40a' of FIG. 11. As illustrated in FIG. 11, operation S40a' may include a plurality of operations S42, S44, and S46. In some embodiments, operation 40a' may be performed by the controller 180 in FIG. 1, and below, FIG. 11 is explained with reference to FIG. 1.

An operation of obtaining the ENOB corresponding to the channel state may be performed (S42). For example, as described above with reference to FIG. 4, the controller 180 may obtain the ENOB corresponding to the channel state included in the state information S_INF, with reference to the ENOB data D40. As described above with reference to FIGS. 5A and 5B, as the channel state is poorer, the ENOB may be reduced.

An operation of adding the obtained ENOB and at least one additional number of bits may be performed (S44). As described above with reference to FIG. 10, the channel between the BS 10 and the UE 100 may be changed. Accordingly, the state information S_INF may not be accurate due to the adjusted ENOB for the low power operation. Accordingly, the controller 180 may apply a margin for considering a change in the channel state to the low power operation, by adding at least one additional number of bits to the ENOB corresponding to the channel state. Next, an operation of generating a control signal may be performed (S46). For example, the controller 180 may generate control signals, for example, the first and second control signals CTR1 and CTR2, based on the ENOB calculated in operation S44.

Figure 12:
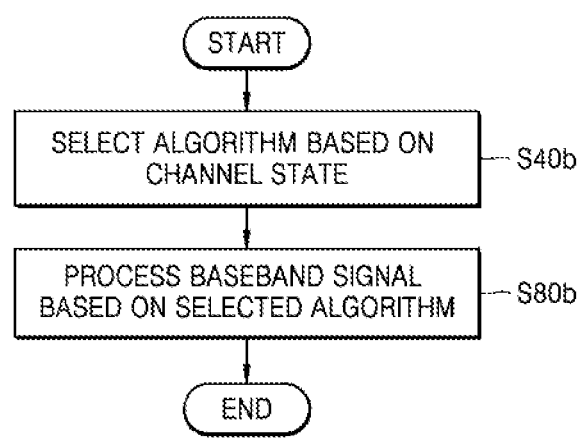
FIG. 12 is a flowchart illustrating an example of a method for wireless communication, according to an example embodiment of the inventive concept.

FIG. 12 is a flowchart illustrating an example of a method for wireless communication, according to an example embodiment of the inventive concept. The flowchart of FIG. 12 illustrates an example of the low power operation performed in a baseband processor. In some embodiments, the method of FIG. 12 may be performed in the UE 100 in FIG. 1, and below, FIG. 12 is explained with reference to FIG. 1.

An operation of selecting an algorithm based on the channel state may be performed (S40b). In some embodiments, the baseband processor 160 may implement a plurality of mutually replaceable algorithms. The plurality of algorithms may have different complexity, performance, and power consumption from each other. For example, the baseband processor 160 may perform demodulation of the baseband signal based on one of a linear minimum mean square error (LMMSE) algorithm and a least square (LS) algorithm. Additionally or alternatively, the baseband processor 160 may perform decoding of the baseband signal based on one of a list decoding algorithm and a normal decoding algorithm. Additionally or alternatively, the baseband processor 160 may perform multiple-input and multiple-output (MIMO) detection based on one of a maximum likelihood (ML) algorithm, a matched filter (MF) algorithm, and a minimum mean squared error (MMSE) algorithm. The above-described LMMSE algorithm, list decoding algorithm, and ML algorithm may provide relatively high performance while causing relatively high power consumption. Additionally or alternatively, the aforementioned LS algorithm, general decoding algorithm, and MF algorithm (or MMSE algorithm) may provide relatively low performance while providing low power consumption.

The baseband processor 160 may select an algorithm providing relatively low performance and low power consumption among a plurality of algorithms, in response to the second control signal CTR2 activating the low power operation. Additionally or alternatively, the baseband processor 160 may select an algorithm providing relatively high performance and high power consumption among a plurality of algorithms, in response to the second control signal CTR2 deactivating the low power operation. Additionally or alternatively, in some embodiments, the baseband processor 160 may reduce the number of near constellation points in modulation based on the ML algorithm, in response to the second control signal CTR2 activating the low power operation.

An operation of processing the baseband signal based on the selected algorithm may be performed (S80b). For example, the baseband processor 160 may demodulate and/or decode the baseband signal based on the algorithm selected in operation S40b.

Figure 13:
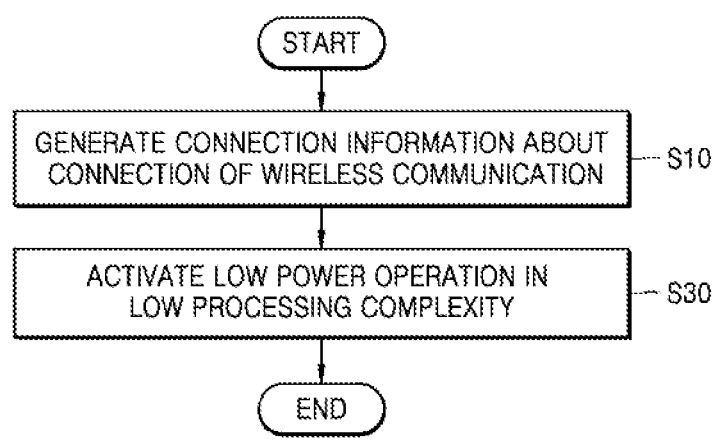
FIG. 13 is a flowchart illustrating an example of a method for wireless communication, according to an example embodiment of the inventive concept.

FIG. 13 is a flowchart illustrating an example of a method for wireless communication, according to an example embodiment of the inventive concept. In some embodiments, the method of FIG. 13 may be performed by the back-end module BE in FIG. 1. As illustrated in FIG. 13, the method for wireless communication of FIG. 13 may include operations S10 and S30, and below, FIG. 13 is described with reference to FIG. 1, and among descriptions with reference to FIG. 13, duplicate descriptions already given with reference to FIG. 2 are omitted.

An operation of generating the connection information C_INF regarding a connection of wireless communication may be performed (S10). For example, the baseband processor 160 may generate the connection information C_INF about the connection between the BS 10 and the UE 100 by processing the baseband signal. The UE 100 may have various connection states, for example, the connected state, the idle state, the DRX state, the initial access state, or the like depending on circumstance, and the baseband processor 160 may generate the connection information C_INF based on the connection state.

The wireless communication system 5 may define a signal processing method of different complexity according to the connection state. For example, the wireless communication system 5 may define a connected state that does not require a high throughput (for example, calling), the idle state, the DRX state, a signal processing method of low complexity in the initial connection state (for example, a low modulation order), etc. In the connection state to which the signal processing method of low complexity is applied, the performance provided by the transceiver 140 and/or the baseband processor 160 may be excessive. Accordingly, the connection information C_INF indicating the connection state may be used to determine whether the low power operation is activated.

An operation of activating the low power operation of low processing complexity may be performed (S30). For example, the controller 180 may activate the low power operation in a first processing complexity less than a second processing complexity, based on the connection information C_INF provided by the baseband processor 160. For example, as described above with reference to FIG. 6 and the like, the controller 180 may generate the first and second control signals CTR1 and CTR2 so that the ENOB of the digital signal is reduced, in the first processing complexity less than the second processing complexity. In some embodiments, one of the plurality of low power operations corresponding to different power consumptions may be selected based on the connection state indicated by the connection information C_INF, and the selected lower power operation may be activated.

Figure 14:
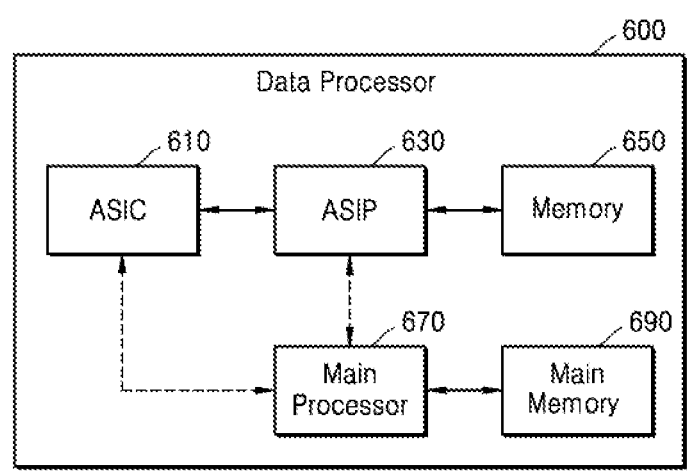
FIG. 14 is a block diagram illustrating a data processor according to an example embodiment.

FIG. 14 is a block diagram illustrating the data processor 600 according to an example embodiment. In some embodiments, the data processor 600 of FIG. 14 may be included in the back-end module BE of FIG. 1, and the baseband processor 160 and/or the controller 180 in FIG. 1 may be implemented in the data processor 600. Hereinafter, FIG. 14 is described with reference to FIG. 1.

As illustrated in FIG. 14, the data processor 600 may include an application-specific integrated circuit (ASIC) 610, an application-specific instruction set processor (ASIP) 630, a memory 650, a main processor 670, and a main memory 690. In some embodiments, two or more of the ASIC 610, the ASIP 630, and the main processor 670 may communicate with each other. Further, in some embodiments, at least two or more of the ASIC 610, the ASIP 630, the memory 650, the main processor 670, and the main memory 690 may be embedded in one chip.

The ASIP 630 may be an integrated circuit customized for a particular usage, support a dedicated instruction set for a particular application, and execute instructions contained in the dedicated instruction set. The memory 650 may communicate with the ASIP 630, and may store, as a non-volatile storage, a plurality of instructions executed by the ASIP 630. For example, the memory 650 may include an arbitrary type memory accessible by the ASIP 630, as a non-limited example, such as random access memory (RAM), read-only memory (ROM), a tape, a magnetic disk, an optical disk, a volatile memory, a non-volatile memory, and a combination thereof. In some embodiments, the memory 650 may store the ENOB data D40 described above with reference to FIGS. 4, 5A, 5B, and the like.

The main processor 670 may control a communication device such as UE 100 by executing a plurality of instructions. For example, the main processor 670 may control the ASIC 610 and the ASIP 630, and may also process a user input to the UE 100. Main memory 690 may communicate with the main processor 670, and include any type of memory accessible by the main processor 670. In some embodiments, the main memory 690 may store a plurality of instructions executed by the main processor 670 as a non-transitory storage device.

In some embodiments, at least a portion of the method of controlling power consumption in wireless communication may be performed by at least one of the components included in the data processor 600 of FIG. 14. For example, at least some of the operations of the baseband processor 160 and/or the controller 180 in FIG. 1 may be implemented as a plurality of instructions stored in the memory 650, and the ASIP 630 may perform at least one of operations of the method of controlling power consumption in wireless communication by executing the plurality of instructions stored in the memory 650. In some embodiments, at least one of the operations of the method of controlling power consumption in wireless communication may be performed by a hardware block designed through logic synthesis, etc., and such hardware block may be included in the ASIC 610. In some embodiments, at least one of the operations of the method of controlling power consumption in wireless communication may be implemented as a plurality of instructions stored in the main memory 690. The main processor 670 may perform at least one of operations of the method of controlling power consumption in wireless communication by executing the plurality of instructions stored in the main memory 690.

Figure 15:
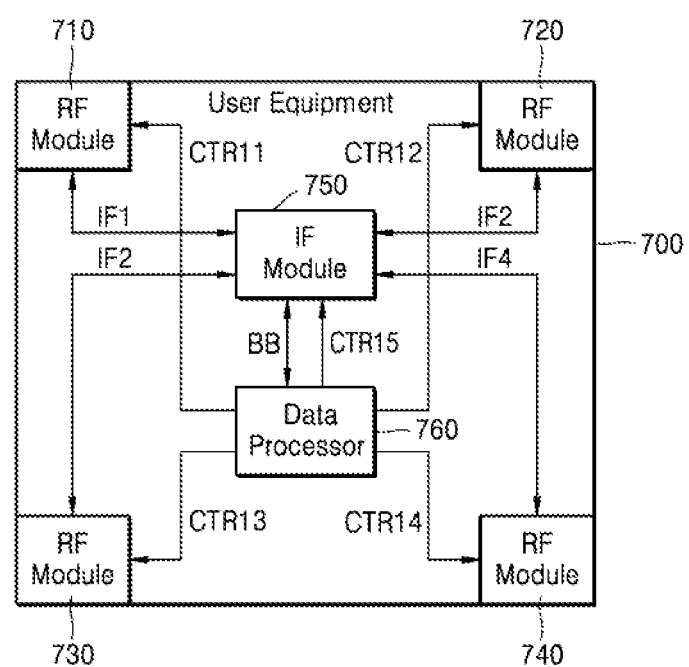
FIG. 15 is a block diagram illustrating user equipment according to an example embodiment of the inventive concept.

FIG. 15 is a block diagram illustrating UE 700 according to an example embodiment of the inventive concept. As illustrated in FIG. 15, the UE 700 may include first through fourth RF modules 710 through 740 as the front-end module FE, and may include an intermediate frequency (IF) module 750 and a data processor 760 as the back-end module BE.

When compared with the UE 100 in FIG. 1, the UE 700 of FIG. 15 may have the IF signal between the RF signal and the baseband signal.

Each of the first through fourth RF modules 710 through 740 may include an antenna and a transceiver, and may communicate with the IF module 750. For example, as illustrated in FIG. 15, the first through fourth RF modules 710 through 740 may transmit or receive first through fourth IF signals IF1 through IF4 with the IF module 750. The transceivers included in each of the first through fourth RF modules 710 through 740 may include a mixer generating the RF signal by up-converting the IF signal and a mixer generating the IF signal by down-converting the RF signal.

The IF module 750 may generate the baseband signal BB by processing the first through fourth IF signals IF1 through IF4, and generate the first through fourth IF signals IF1 through IF4 by processing the baseband signal BB. The IF module 750 may include a mixer for down-conversion of the first through fourth IF signals IF1 through IF4 and a mixer for up-conversion of the baseband signal BB.

The data processor 760 may process the baseband signal BB. As illustrated in FIG. 15, in some embodiments, the data processor 760 may include the baseband processor 160 and the controller 180 in FIG. 1, and may generate first through fifth control signals CTR11 through CTR15 for activating or deactivating the low power operation based on the state information S_INF and the connection information C_INF. As illustrated in FIG. 15, the first through fourth RF modules 710 through 740 may receive the first through fourth control signals CTR11 through CTR14, respectively, and may perform the low power operations based on the first through fourth control signals CTR11 through CTR14, respectively. Additionally or alternatively, the IF module 750 may receive the fifth control signal CTR15 and may perform the low power operation based on the fifth control signal CTR15 activating the low power operation.

While the inventive concept has been particularly shown and described with reference to embodiments thereof, it will be understood that various changes in form and details may be made therein without departing from the spirit and scope of the following claims.

What is claimed is:

1. An apparatus for wireless communication, the apparatus comprising:
    a baseband processor configured to generate state information about a channel of the wireless communication by processing a baseband signal; and
    a controller configured to activate a low power operation in a connected state when in a first channel state that is worse than a second channel state based on the state information, wherein the low power operation is based on a second operation mode that uses a reduced number of bits for processing the baseband signal compared to a first operation mode.

2. The apparatus of claim 1, further comprising an analog-to-digital converter configured to convert an analog signal generated from a signal received through the channel into a digital signal,
    wherein the baseband processor is configured to process the digital signal as the baseband signal, and
    the controller is configured to generate a control signal activating the low power operation so that an effective number of bits of the digital signal is reduced.

3. The apparatus of claim 2, further comprising an interface circuit configured to transmit the digital signal from the analog-to-digital converter to the baseband processor, wherein the interface circuit is configured to omit transmission of at least one least significant bit of the digital signal, in response to the control signal activating the low power operation.

4. The apparatus of claim 3, wherein the interface circuit comprises:
    at least one signal line;
    a transmission circuit configured to generate a first signal by removing the at least one least significant bit of the digital signal and transmit the first signal through the at least one signal line, in response to the control signal activating the low power operation; and
    a reception circuit configured to generate a second signal by concatenating at least one bit to a signal received and provide the second signal through the at least one signal line to the baseband processor, in response to the control signal activating the low power operation.

5. The apparatus of claim 2, wherein the baseband processor further comprises a clock gating circuit configured to block a clock signal provided to a circuit configured to process at least one least significant bit of the baseband signal, in response to the control signal activating the low power operation.

6. The apparatus of claim 2, wherein the baseband processor further comprises a padding circuit configured to set at least one least significant bit of the baseband signal at a certain value, in response to the control signal activating the low power operation.

7. The apparatus of claim 2, wherein the controller is configured to obtain a first effective number of bits corresponding to the first channel state, and generate the control signal activating the low power operation so that the effective number of bits of the digital signal matches a sum of the first effective number of bits and at least one additional number of bits.

8. The apparatus of claim 2, wherein the controller is configured to generate a control signal activating a generation of the state information so that the effective number of bits of the digital signal periodically reaches a maximum, and
    the baseband processor is configured to generate the state information in response to the control signal activating a generation of the state information.

9. The apparatus of claim 1, wherein the controller is configured to generate a control signal activating the low power operation in the first channel state, and
    the baseband processor is configured to process the baseband signal based on a first algorithm corresponding to low performance and low power consumption instead of a second algorithm corresponding to high performance and high power consumption, in response to the control signal activating the low power operation.

10. The apparatus of claim 1, wherein the state information comprises at least one of a signal to noise ratio (SNR), a signal to interference and noise ratio (SINR), a reference signal received power (RSRP), a channel quality indicator (CQI) index, and a modulation coding scheme (MCS) index.

11. The apparatus of claim 1, wherein the baseband processor is further configured to generate connection information about connection of the wireless communication by processing the baseband signal, and
    the controller is configured to activate the low power operation in a first processing complexity of the baseband signal, which is less than a second processing complexity of the baseband signal, based on the connection information.

12. The apparatus of claim 11, wherein the connection information comprises information about at least one of the connected state, an idle state, a discontinuous reception (DRX) state, and an initial access state.

13. A method for wireless communication performed by a wireless communication apparatus, the method comprising:
generating state information about a channel of the wireless communication by processing a baseband signal;
activating a low power operation in a first channel state that is worse than a second channel state, based on the state information; and
converting an analog signal generated from a signal received through the channel into a digital signal in response to a control signal activating the low power operation,
wherein the converting of the analog signal into the digital signal comprises omitting an operation of generating at least one least significant bit of the digital signal.

14. The method of claim 13,
wherein the generating of the state information comprises processing the digital signal as a baseband signal, and
the activating of the low power operation comprises generating a control signal activating the low power operation so that an effective number of bits of the digital signal is reduced.

15. The method of claim 13, further comprising:
generating connection information about connection of the wireless communication by processing the baseband signal; and
activating the low power operation in a first processing complexity of the baseband signal, which is less than a second processing complexity of the baseband signal, based on the connection information.

16. An apparatus for wireless communication comprising:
an analog-to-digital converter configured to convert an analog signal generated from a signal received through a channel into a digital signal;
a baseband processor configured to generate state information about the channel of the wireless communication by processing the digital signal; and
a controller configured to adjust an effective number of bits of the digital signal based on the state information and to generate a control signal activating a generation of the state information so that the effective number of bits of the digital signal periodically reaches a maximum.

17. The apparatus of claim 16, wherein the controller is configured to generate a control signal to reduce the effective number of bits in a first channel condition that is worse than a second channel condition, based on the state information.

18. The apparatus of claim 16, wherein the baseband processor further generates connection information about connection of the wireless communication by processing the digital signal, and
and the controller adjusts the effective number of bits, further based on the connection information.

19. The apparatus of claim 18, wherein the controller is configured to generate a control signal so that the effective number of bits is reduced in a first processing complexity of the digital signal, which is less than a second processing complexity of the digital signal, based on the connection information.

* * * * *